(No Model.)

W. R. TWIGGS.
GRASS RECEPTACLE FOR LAWN MOWERS.

No. 370,361. Patented Sept. 20, 1887.

Witnesses: William R. Twiggs. Inventor.

United States Patent Office.

WILLIAM R. TWIGGS, OF SANDUSKY, OHIO, ASSIGNOR OF ONE-FOURTH TO SILAS E. BAUDER, OF SAME PLACE.

GRASS-RECEPTACLE FOR LAWN-MOWERS.

SPECIFICATION forming part of Letters Patent No. 370,361, dated September 20, 1887.

Application filed November 15, 1886. Serial No. 218,976. (No model.)

*To all whom it may concern:*

Be it known that I, WILLIAM R. TWIGGS, a citizen of the United States, residing at Sandusky, in the county of Erie and State of Ohio, have invented a new and useful Grass-Receptacle for Lawn-Mowers of every description, of which the following is a specification.

My invention is designed for receiving and carrying off the grass cut by all kinds of lawn-mowers. I attain this object by the mechanism illustrated in the accompanying drawings, in which—

Figure 1:
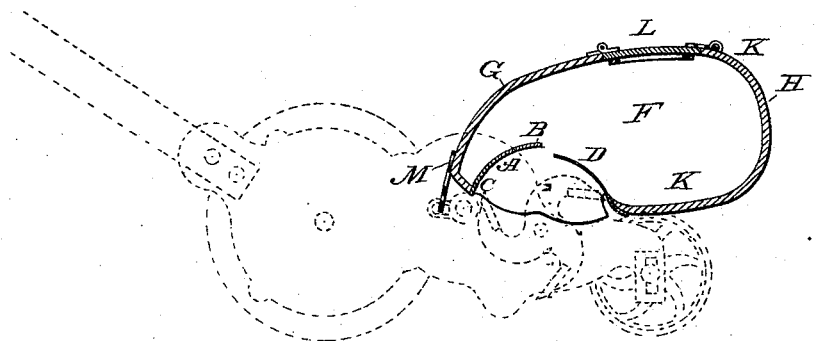
Figure 2:
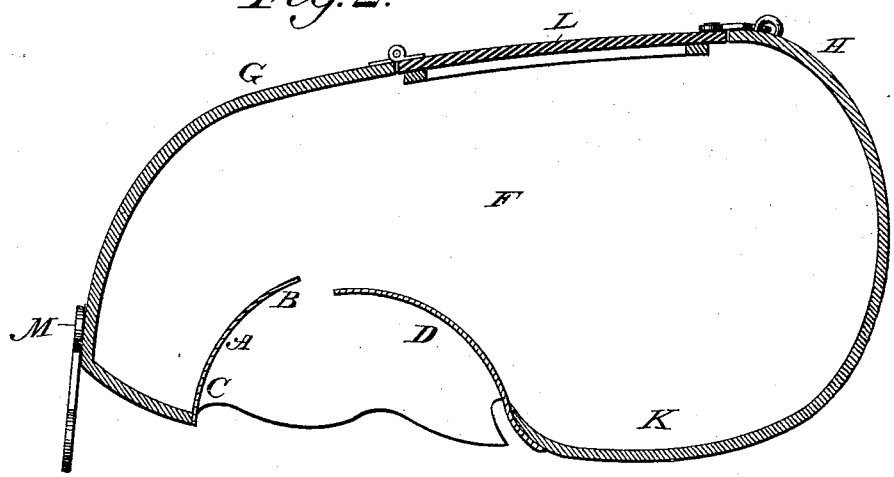

Figure 1 is a vertical section showing my invention in place upon a lawn-mower. Fig. 2 is an enlarged vertical section of said invention.

G H K is the receptacle for holding the cut grass.

C A B D represents the place occupied by the revolving cutters. The part B A C is produced below, so as to meet the rear of the cutting-bar of every class of machine. C A B is constructed so as to come close to the circumference of the circle described by the edges of the cutters in their revolution. This portion of my invention is so constructed that the point C lies practically in the line of said circumference-point A, at some little distance outside of it, and the point B at a greater distance than A, in order to prevent the machine from choking. The upper part, D, lies very close to the line of said circumference, in order to prevent the grass from being carried along under it with the cutters and falling before them, thereby preventing the cutting of said grass more than once and leaving a clean-mown surface. The curved surface C A B lies nearly in the line of the direction given the cut grass by the motion of the knives, and as the portions of cut grass leave said cutters by the centrifugal force said surface prevents the grass from falling backward and directs it toward the point F into the middle of said receptacle.

The whole object of my invention is to utilize the momentum given the cut grass by the motion of the cutters, and without the aid of further machinery to direct said grass into a receptacle large enough to hold a considerable quantity.

M represents a hook which I use to fasten my invention to the lawn-mower.

The portions of the sides of the receptacle inclosed by the part A B C and part D prevent the grass from falling out at the ends of the cutters.

L is a door, by means of which access may be gained to the inner part of the receptacle, permitting the same to be emptied without detaching it from the mower. I adjust this invention to the several kinds of lawn-mower by varying the shape to suit the several machines.

I am aware that prior to my invention machines have been invented for accomplishing the object which I have in view; but, as far as I know, they are all burdened by machinery, elevators, and other contrivances involving friction, and none are to my knowledge as simple as my own.

I construct my invention wholly or in part of metal, wood, cloth, or leather, or any light and durable substance.

Having thus described my invention, I claim and desire to secure by Letters Patent of the United States—

A grass-receptacle for lawn-mowers, a portion of which, C A B, lies near the circumference of the circle described by the revolving cutters, the point C lying practically in the line of said circumference, the point A at some little distance outside of it, and the point B at a greater distance than A, and having a portion, D, lying close to the said circumference, and a lid or cover, and means, substantially as described, for securing the receptacle and lawn-mower.

WILLIAM R. TWIGGS. [L. S.]

Witnesses:
 STANLEY A. CURRAN,
 JAMES R. DAVIES.